United States Patent Office 3,236,730
Patented Feb. 22, 1966

3,236,730
BLEPHARITIS COMPOSITION COMPRISING ANTISEPTIC, QUATERNARY AMMONIUM COMPOUND, KERATOLYTIC AGENT AND A CHELATING COMPOUND
Miles A. Galin, Woodmere, N.Y., assignor to Miles Laboratories, Inc., Elkhart, Ind., a corporation of Indiana
No Drawing. Filed Jan. 4, 1962, Ser. No. 164,647
2 Claims. (Cl. 167—59)

This invention relates to pharmaceutical compositions. Particularly the invention relates to pharmaceutical compositions which are useful as dermatological preparations. Still more particularly, the invention relates to pharmaceutical preparations which have utility in the treatment and control of opthalmological disorders commonly referred to as blepharitis.

One of the most common dermatologic conditions coming to the attention of ophthalmologists is that condition known as blepharitis. This indication is frequently treated by general practitioners and by dermatologists. It has been believed to be essentially not curable, and a condition which requires constant care.

The blepharitis problem has been generally divided into two major groups, ulcerative blepharitis and sebhorreic blepharitis. Ulcerative blepharitis is presumed to be due to bacterial contamination or sensivity and is believed to be a local entity. Sebhorreic blepharitis on the other hand, is part of a systemic disorder of the skin in which lid margin changes are but one aspect of the disease entity. If inadequately treated both of these major groups of conditions lead to loss of cilia, reduction of lid tone, recurrent chalazia and hordeola, as well as reddened, teary eyes.

Prior to the instant invention, no therapeutic has appeared which combines rational therapy for both of these major groups of disorders. The combination of agents for attacking the conditions which result in both ulcerative and sebhorreic blepharitis is the object of this invention and is described hereinafter.

In general the instant invention comprises the therapeutic composition which combines a non-sensitizing antiseptic, a detergent, a keratolytic agent and a chelating agent. When combined in the proper ratios, as will be described below, this new composition causes a general reduction in bacterial count and return to the normal flora of the eye, removal of scales and debris, increase in keratin production as well as keratolysis and a general increase in skin turgor.

The invention can be more clearly described by reference to the following example which is to be considered illustrative only and not limiting in any aspect:

EXAMPLE I

| | Percent |
|---|---|
| Yellow oxide of mercury, N.F. | 1.0 |
| Salicylic acid USP | 1.0 |
| Methyl benzethonium chloride | 0.1 |
| Tetra sodium ethylene diamine tetra-acetate | 0.15 |
| White petrolatum, USP | 97.75 |

The petrolatum was heated in a container such as a glass beaker until melted. A portion of the melted petrolatum was removed and the salicylic acid, the oxide of mercury and the tetra sodium salt were slurried therein. This slurry was then re-added to the remainder of the melted petrolatum, and the methyl benzethonium chloride was added to the total mixture and the heat removed.

The total liquid was then mixed thoroughly with a laboratory propellor type stirrer until it had reached room temperature. The cooled material was then homogenized by suitable means and packaged for use.

The preparation of Example I has been used in several hundred patients with excellent results. The clinical results of these studies are set out below:

Clinical studies

*Study A.*—In this clinical study 120 patients, both male and female, between the ages of 17 and 56 were treated for blepharitis by application of material in Example I. The treatment varied from twice daily application to twice weekly and from 6 weeks to 18 months. In every instance the clinical progress of these patients was indicated as improved.

*Study B.*—In another study 24 cases of blepharitis was treated with the material of Example I. The material was applied originally four times each day and gradually reduced to twice daily and then applied when necessary. There were 15 excellent and 9 good responses to this treatment.

*Study C.*—In this study 16 patients were treated with the material of Example I. The types of conditions treated and the results obtained are listed below:

| Diagnosis | No. Patients | Results | | | |
|---|---|---|---|---|---|
| | | Excellent | Good | Fair | Poor |
| Blepharitis | 16 | 2 | 7 | 6 | 1 |

Pharmacology

The material of Example I was subjected to two separate pharmacological studies as follows:

*No. 1.*—The preparation was instilled into the eyes of 3 normal, healthy, albino rabbits according to the procedure described in "Appraisal of the Safety of Chemicals in Foods, Drugs and Cosmetics," Dr. J. H. Draize, published by the Association of the Food and Drug Officials of the U.S.A. Each animal had 0.1 ml. of the test material instilled into the right eye with the untreated left eye serving as a control. The animals were kept in stocks (Draize, J. H., Jr., Pharmacological and Experimental Therapy, Vol. 82, December 1944), for several hours to prevent their rubbing of the treated eyes, and then returned to their cages. The treated eyes were examined every 24 hours for 4 days, and then again on the 7th day. No irritation was observed on any of the test animals.

*No. 2.*—0.1 gram of the material of Example I was instilled into the right eye of 24 rabbits leaving the untreated left eye as a control. The treated eyes were examined every 24 hours for 4 days, and then again on the 7th day. Corneal examination and subsequent histological sections revealed no abnormality of the treated eyes. Slit-lamp examination of corneas showed no effects of any irritation.

Although in the example given above definite percentages of the components of the composition of this invention have been given, it is to be understood that other ranges of percentages of these and equivalent materials may be used without departing from the inventive concept. Set out below in tabular form are given preferred and operable percent ranges of the various agents which are combined in the novel therapeutic compositions of this invention.

TABLE I

| | Preferred and operable percent ranges |
|---|---|
| (1) Non-sensitizing antiseptic | 0.5–2.0 |
| (2) Detergent | 0.05–0.5 |
| (3) Keratolytic agent | 0.5–2.0 |
| (4) Chelating agent | 0.05–0.5 |

In addition to those specific examples set out in Example I above, the following operable materials equivalent thereto may be used:

(1) Non-sensitizing antiseptic—zinc oxide, zinc sulfate, boric acid, metacresyl acetate, thimerosal etc.
(2) Detergent—benzethonium chloride, cetyl trimethyl pyridinium chloride and other quaternary ammonium antiseptics in common use as antiseptic detergents.
(3) Keratolytic agents—resorcinol, resorcinol monoacetate, silver nitrate.
(4) Chelating agents—N-hydroxy ethylene diamine triacetic acid (HEDTA), diethylenetriaminepentaacetic acid (DTPA), N-dihydroxy ethyl glycine (DHEG).

The active ingredients of the composition of this invention are described as being incorporated into white petrolatum as a vehicle. Other combining means may be used. For example, instead of white petrolatum one may blend the active ingredients of this invention in materials such as petrolatum combined with non-ionic surfactants and emollients such as cetyl alcohol and others known to the art.

What is claimed is:

1. A composition for the treatment of blepharitis which comprises about from 0.5% to 2% of mercuric oxide, about from 0.05% to 0.5% of methyl benzethonium chloride, about from 0.5% to 2% of salicylic acid and about from 0.05% to 0.5% of tetrasodium ethylenediamine tetraacetate.

2. A therapeutic composition comprising in combination the following, yellow oxide of mercury, N.F., 1.0%, salicylic acid, U.S.P, 1.0%, methyl benzethonium chloride 0.1%, tetra sodium ethylene diamine tetra-acetate 0.15%, and white petrolatum, U.S.P., 97.75%, the above percentages being by weight based on the weight of the total composition.

References Cited by the Examiner
UNITED STATES PATENTS
2,785,154  3/1957  Locke et al. _____ 167—59 X

OTHER REFERENCES

Halpern et al., Journal of American Pharmaceutical Association Prac. Pharm., January 1950, pp. 24–26.

Merck Index, Seventh Edition, Merck and Co., Inc., Rahway, New Jersey (1960) (pages 130, 652, and 672).

Rosoff et al., Archives of Biochemistry and Biophysics 78 (1): page 2, November 1958.

Schradie et al., Journal of American Pharmaceutical Association Prac. Pharm. 20 (4): 197–199 (1959).

JULIAN S. LEVITT, *Primary Examiner.*

FRANK CACCIAPAGLIA, JR., LEWIS GOTTS,
*Examiners.*